(12) United States Patent
Pendleton (10) Patent No.: US 9,310,011 B2
(45) Date of Patent: Apr. 12, 2016

(54) FLUID END MANIFOLDS AND FLUID END MANIFOLD ASSEMBLIES

(75) Inventor: Gary Pendleton, Spring, TX (US)

(73) Assignee: Axon EP, Inc., Houston, TX (US)

( * ) Notice: Subject to any disclaimer, the term of this patent is extended or adjusted under 35 U.S.C. 154(b) by 729 days.

(21) Appl. No.: 13/082,565

(22) Filed: Apr. 8, 2011

(65) Prior Publication Data

US 2012/0255634 A1 Oct. 11, 2012

(51) Int. Cl.
*F16L 41/03* (2006.01)
*F04B 53/16* (2006.01)
*F15B 13/08* (2006.01)

(52) U.S. Cl.
CPC .............. *F16L 41/03* (2013.01); *F04B 53/16* (2013.01); *F15B 13/0882* (2013.01); *Y10T 137/85938* (2015.04)

(58) Field of Classification Search
CPC .................. F15B 13/0821; F15B 13/0882
USPC ............ 137/269–271, 884; 285/124.1–124.5, 285/19
See application file for complete search history.

(56) References Cited

U.S. PATENT DOCUMENTS

| | | | |
|---|---|---|---|
| 3,513,876 A * | 5/1970 | Tarbox ........................... | 137/596 |
| 3,563,265 A * | 2/1971 | Graham .......................... | 137/269 |
| 3,739,804 A * | 6/1973 | Dubreuil ........................ | 137/269 |
| 3,756,274 A * | 9/1973 | Wolfgramm .................. | 137/561 R |
| 3,788,344 A * | 1/1974 | Dyck .............................. | 137/271 |
| D242,708 S * | 12/1976 | Major et al. .................. | D23/247 |
| 4,136,713 A * | 1/1979 | Humphreys .................. | 137/561 A |
| 4,524,807 A * | 6/1985 | Toliusis ......................... | 137/884 |
| 4,848,391 A * | 7/1989 | Miller et al. .................. | 137/270 |
| 5,927,337 A * | 7/1999 | LaMantia ...................... | 137/883 |
| 6,125,884 A | 10/2000 | Hughes | |
| 7,021,332 B2 * | 4/2006 | Greenwood et al. .......... | 137/596 |
| 7,096,889 B1 * | 8/2006 | Roys .............................. | 137/884 |
| 7,464,726 B2 * | 12/2008 | Mertes et al. ................. | 137/884 |
| 8,465,268 B2 * | 6/2013 | Baxter et al. .................. | 417/437 |
| 2006/0005891 A1 | 1/2006 | Doyle | |
| 2006/0038399 A1 * | 2/2006 | Tremoulet et al. ......... | 285/124.5 |

(Continued)

FOREIGN PATENT DOCUMENTS

| | | |
|---|---|---|
| CN | 101205903 A | 6/2008 |
| CN | 101498393 A | 8/2009 |
| DE | 19859188 A1 | 6/2000 |

(Continued)

OTHER PUBLICATIONS

International Search Report and Written Opinion issued in related PCT Application No. PCT/US2012/032501, mailed Jun. 29, 2012 (7 pages).
International Preliminary Report on Patentability issued in related PCT Application No. PCT/US2012/032501, mailed Oct. 8, 2013 (6 pages).

(Continued)

*Primary Examiner* — John Fox
(74) *Attorney, Agent, or Firm* — Baker Botts L.L.P.

(57) ABSTRACT

A fluid end manifold comprising a body having a front side and a back side, a first cylinder bore formed horizontally through the body, a second cylinder bore formed vertically through the body, a front mating face, and a back mating face, wherein the first and second cylinder bores intersect within the body to define an intersection region, wherein the front mating face is positioned on the front side of the body at a location corresponding to the intersection region, and wherein the back mating face is positioned on the back side of the body at a location corresponding to the intersection region.

6 Claims, 5 Drawing Sheets

(56) References Cited

U.S. PATENT DOCUMENTS

2010/0140153 A1    6/2010   Telepciak et al.
2011/0081268 A1*   4/2011   Ochoa et al. .................. 417/521

FOREIGN PATENT DOCUMENTS

WO      2011009839 A1    1/2011
WO      2011027273 A2    3/2011

OTHER PUBLICATIONS

First Office Action issued in related Chinese application No. 201280028009.2, mailed Apr. 1, 2015 (20 pages).

Examination Report No. 1 issued in related Australian application No. 2012239985, mailed Nov. 16, 2015 (3 pages).

Extended European Search Report issued in related European application No. 12768564.2, mailed Jul. 21, 2014 (7 pages).

* cited by examiner

FLUID END MANIFOLDS AND FLUID END MANIFOLD ASSEMBLIES

BACKGROUND

The pump industry has used reciprocating pumps for many years to great effect. However, over the years, the market has placed higher demands on reciprocating pumps to operate at higher flow rates and pressures and to have longer operation lives. These market demands are pushing pumps to the limits of current design and materials technology. One result of these market demands has been an increase in failures rates of fluid end manifolds for reciprocating pumps.

Within the fluid end manifolds, several interactions are being realized as the pump operates with the reciprocating cycle. During the pump operation, fluids are compressed within the fluid end manifold, creating positive pressure during pumping. After the compression cycle is completed, the reciprocating action continues creating a vacuum within the fluid end chamber which then draws fluid back into the fluid end manifold. These pumps must operate continuously at speeds up to 350 cycles per minute. Pressures generated within the fluid end manifolds can be up to 20,000 psi or more.

Consequently, the fluid end manifold is constantly under variable stressing. This constant variable stressing may result in fatigue. It is well known within the industry that fatigue has a significant effect on the fluid end manifold life expectancy, often resulting in fatigue failure of the fluid end manifolds. This fatigue failure may be a result of the fluid end manifold flexing and/or ballooning under internal pressure loads. Fatigue failure may occur if the pressures realized within the fluid end manifold are high enough to effect the material stressing.

Thus, there is a need for an improved fluid end manifold assembly that is able to withstand the variable stressing associated with high pressure pumps.

SUMMARY

The present invention relates to improved fluid end manifold assemblies. More particularly, the present invention relates to improved fluid end manifolds and fluid end manifold assemblies adapted to utilize compressive stresses as to minimize tensile stresses.

In one embodiment, the present invention provides a fluid end manifold comprising: a body having a front side and a back side; a first cylinder bore formed horizontally through the body; a second cylinder bore formed vertically through the body; a front mating face; and a back mating face, wherein the first and second cylinder bores intersect within the body to define an intersection region, wherein the front mating face is positioned on the front side of the body at a location corresponding to the intersection region, and wherein the back mating face is positioned on the back side of the body at a location corresponding to the intersection region.

In another embodiment, the present invention provides a fluid end manifold assembly comprising: a first fluid end manifold, wherein the first fluid end manifold comprises: a body having a front side and a back side; a first cylinder bore formed horizontally through the body; a second cylinder bore formed vertically through the body; a front mating face; and a back mating face, wherein the first and second cylinder bores intersect within the body to define an intersection region, wherein the front mating face is positioned on the front side of the body at location corresponding to the intersection region, and wherein the back mating face is positioned on the back side of the body at location corresponding to the intersection region; and a second fluid end manifold, wherein the second fluid end manifold comprises: a body having a front side and a back side; a first cylinder bore formed horizontally through the body; a second cylinder bore formed vertically through the body; a front mating face; and a back mating face, wherein the first and second cylinder bores intersect within the body to define an intersection region, wherein the front mating face is positioned on the front side of the body at location corresponding to the intersection region, and wherein the back mating face is positioned on the back side of the body at location corresponding to the intersection region, wherein the first fluid end manifold and the second fluid end manifold are positioned relative to one another so that the back mating face of the first fluid end manifold is in line with the front mating face of the second fluid end manifold.

In another embodiment, the present invention provides a method for inducing compressive stresses within a fluid end manifold comprising: providing a fluid end manifold, the fluid end manifold comprising: a front side and a back side; a first cylinder bore formed horizontally through the body; a second cylinder bore formed vertically through the body; a front mating face; and a back mating face, wherein the first and second cylinder bores intersect within the body to define an intersection region, wherein the front mating face is positioned on the front side of the body at location corresponding to the intersection region, and wherein the back mating face is positioned on the back side of the body at location corresponding to the intersection region; and applying a compressive force to the front mating face and the back mating face.

The features and advantages of the present invention will be readily apparent to those skilled in the art. While numerous changes may be made by those skilled in the art, such changes are within the spirit of the invention.

BRIEF DESCRIPTION OF THE DRAWINGS

A more complete and thorough understanding of the present embodiments and advantages thereof may be acquired by referring to the following description taken in conjunction with the accompanying drawings.

DETAILED DESCRIPTION

The present invention relates to improved fluid end manifold assemblies. More particularly, the present invention relates to improved fluid end manifolds and fluid end manifold assemblies adapted to utilize compressive stresses as to minimize tensile stresses.

There may be several potential advantages to the fluid end manifolds and the fluid end manifold assemblies disclosed herein. One of the many potential advantages of the fluid end manifolds and the fluid end manifold assemblies disclosed herein is that they may provide a fluid end manifold and a fluid end manifold assembly that is able to resist fatigue failure more adequately than conventional fluid end manifolds and conventional fluid end manifold assemblies. Another potential advantage of the fluid end manifolds and fluid end manifold assemblies disclosed herein is that they may be able to operate at higher pressures and flow rates than conventional fluid end manifolds and conventional fluid end manifold assemblies.

Figure 1A:
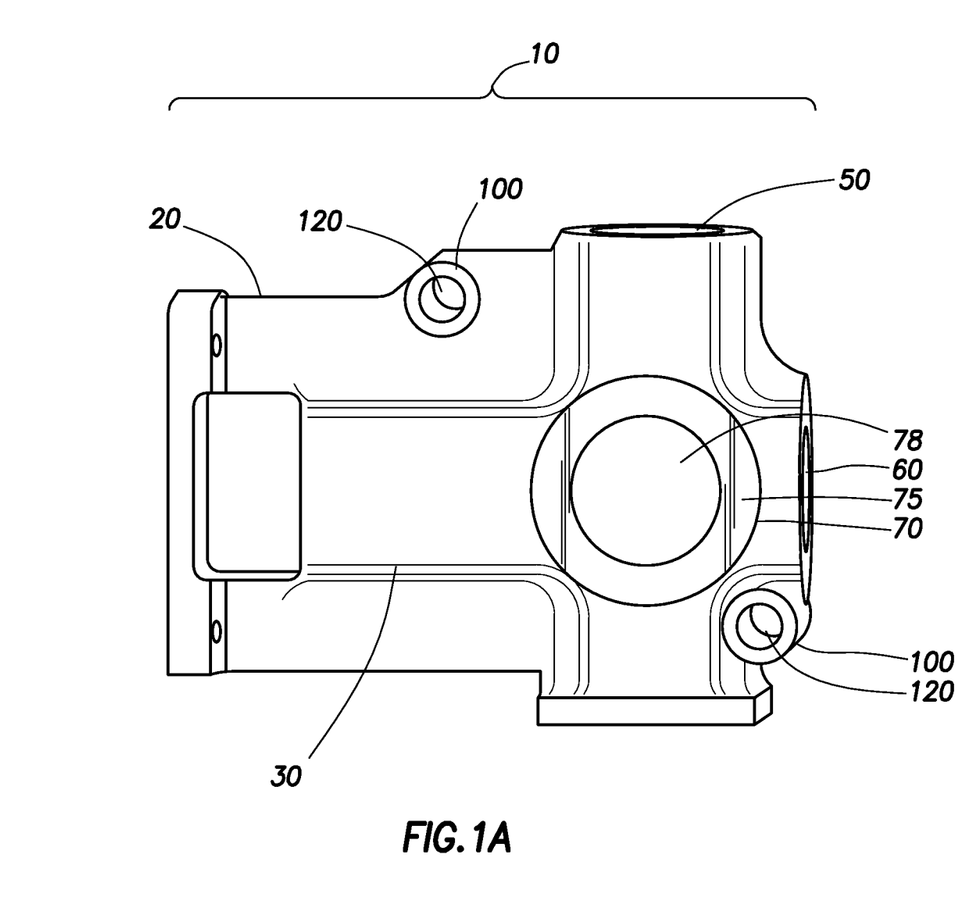
FIGS. 1A and 1B are illustrations depicting an embodiment of a fluid end manifold of the present invention.
Figure 1B:
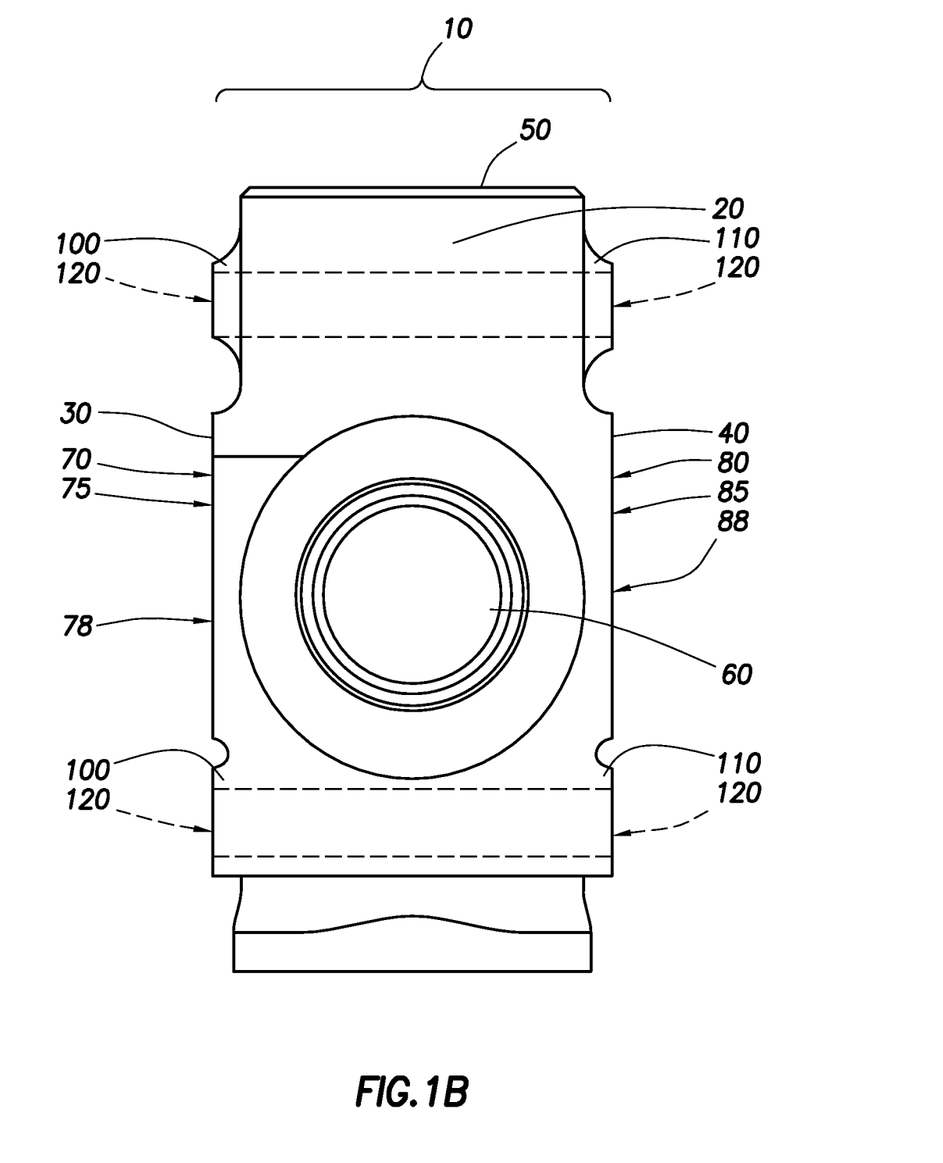
Figure 2:
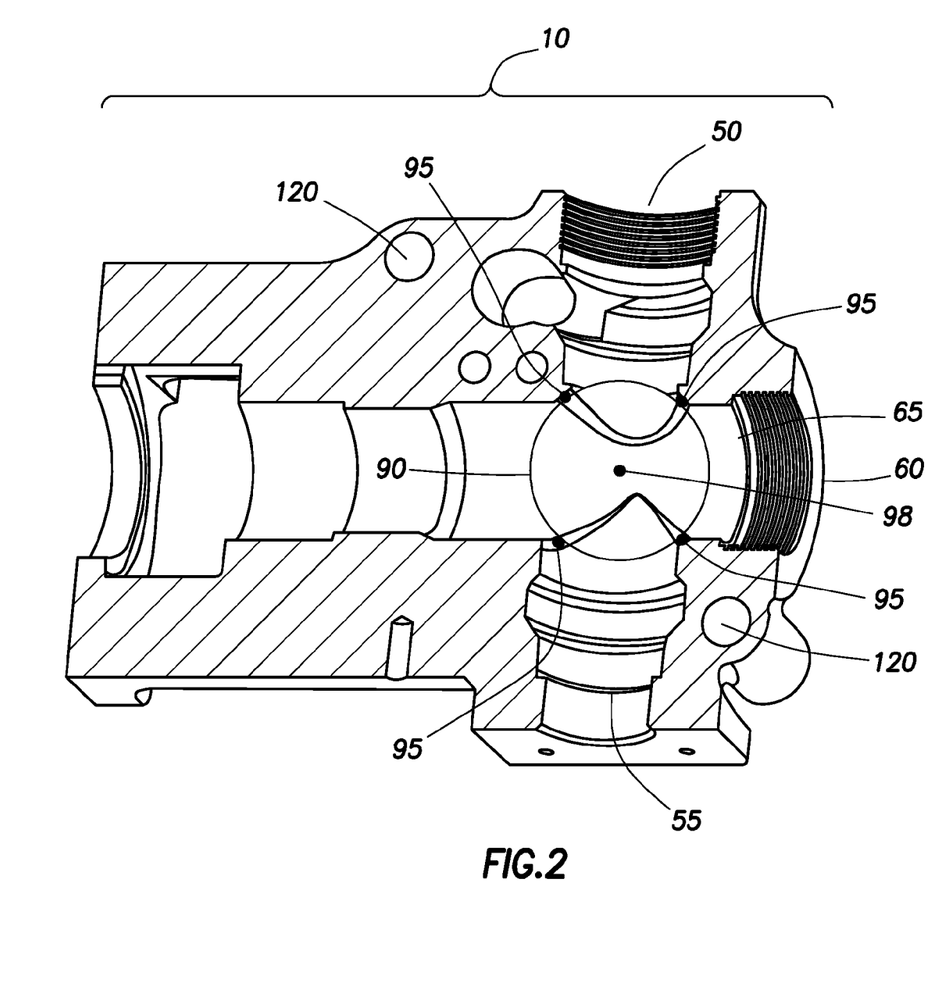
FIG. 2 is an illustration depicting an embodiment of a fluid end manifold of the present invention.

Referring now to FIGS. 1A and 1B and FIG. 2, a fluid end manifold 10 in accordance with one embodiment of the present invention is illustrated. As illustrated, fluid end manifold 10 includes body 20, front side 30, back side 40, first cylinder bore 50, second cylinder bore 60, front mating face 70, and back mating face 80. First cylinder bore 50 and second cylinder bore 60 intersect in region 90 (as shown in FIG. 2). Fluid end manifold 10 may further include one or more front connection surfaces 100, one or more back connection surfaces 110, one or more additional cylinder bores 120, one or more front cross-bars, one or more back cross-bars, and one or more hydraulic restraints. FIGS. 1A and 1B depict a fluid end manifold comprising two front connection surfaces 100, two back connection surfaces 110, and two additional cylinder bores 120.

In one embodiment, body 20 of fluid end manifold 10 may be constructed out of any suitable material to withstand pressures of up to 20,000 psi and temperatures up to 400° F. In some embodiments, body 20 may be constructed out of any suitable material, preferably high tensile materials. In some embodiments, body 20 may be constructed out of AISI 4140 steel, AISI 4330 steel, or derivatives thereof. Body 20 may be of any suitable shape or size. In some embodiments, body 20 may be any shape which allows crossing of first cylinder bore 50 and second cylinder bore 60. In certain embodiments, body 20 may be T shaped.

In some embodiments, fluid end manifold 10 may comprise first cylinder bore 50 and second cylinder bore 60. In some embodiments, first cylinder bore 50 may comprise a surface 55 (as shown in FIG. 2). In some embodiments, second cylinder bore 60 may comprise a surface 65 (as shown in FIG. 2). In some embodiments, first cylinder bore 50 may be a horizontal cylinder bore. In some embodiments, second cylinder bore 60 may be a vertical cylinder bore. First cylinder bore and second cylinder bore may be of any size. In some embodiments, first cylinder bore 50 and second cylinder bore are the same size. In some embodiments, first cylinder bore and second cylinder bore 60 may be from 3.125 inches to 6 inches in diameter. In some embodiments, first cylinder bore 50 and/or second cylinder bore 60 may extend all the way through body 20. In some embodiments, first cylinder bore 50 and/or second cylinder bore 60 may only extend through a portion of body 20. In some embodiments, first cylinder bore 50 and second cylinder bore 60 may be perpendicular to one another. In some embodiments, first cylinder bore 50 and second cylinder bore 60 may intersect within body 20 to define intersection region 90 (as shown in FIG. 2). In some embodiments, surface 55 of first cylinder bore 50 may be in contact with surface 65 of second cylinder bore 60 to define one or more contacts points 95 (as shown in FIG. 2). In some embodiments intersection region 90 may be defined by a region comprising contact points 95. In some embodiments, intersection region 90 may be defined as a circular shaped region of space having a diameter in a plane perpendicular to both first cylinder bore 50 and second cylinder bore 60 including contact points 95. In some embodiments, the intersection region 90 may include a midpoint 98 that is in the center of intersection region 90.

In certain embodiments, fluid end manifold 10 may comprise front mating face 70 and back mating face 80. Front mating face 70 and back mating face 80 may be constructed out of any suitable high tensile material to withstand pressures of up to 20,000 psi and temperatures up to 400° F. In some embodiments, front mating face 70 and back mating face 80 may be constructed out of AISI 4130 steel, AISI 4330 steel, or derivatives thereof. In some embodiments, front mating face 70 and back mating face 80 may be constructed out of the same material as body 20. In other embodiments, front mating face 70 and back mating face 80 may be constructed out of a material different than body 20. In some embodiments, front mating face 70 and back mating face 70 may be constructed out of the same material. In other embodiments, front mating face 70 and back mating face 80 may be constructed out of different materials. In some embodiments, front mating face 70 and back mating face 80 may be a part of body 20.

Front mating face 70 and back mating face 80 may be of any suitable shape or size. In some embodiments, front mating face 70 and back mating face 80 may comprise flat surface 75 and flat surface 85, respectively. Flat surfaces 75 and 85 may be perpendicular to the plane formed by first cylinder bore 50 and second cylinder bore 60. In some embodiments, flat surfaces 75 and 85 may be circular shaped. In other embodiments, flat surfaces 75 and 85 may be ring shaped, comprising an outer diameter and an inner diameter. Flat surfaces 75 and 85 may be any size. In some embodiments, flat surfaces 75 and 85 may have an outer diameter that is larger than the diameter of intersection region 90. In some embodiments, flat surfaces 75 and 85 may have an inner diameter that is smaller than the diameter of intersection region 90. In some embodiments, flat surfaces 75 and 85 may have an inner diameter of from about 1 inch to about 6 inches. In some embodiments, flat surfaces 75 and 85 may have an outer diameter of from about 3.125 inches to about 9 inches. As shown in FIG. 1A, the center of flat surface 75 may define a point of space, center point 78. Similarly, the center of flat surface 85 may define a point of space, center point 88 (not illustrated).

In certain embodiments, front mating face 70 may be positioned on front side 30 of body 20. In certain embodiments, front mating face 70 may be positioned on front side 30 of body 20 at a location corresponding to region 90. In certain embodiments, front mating face 70 may be positioned on front side 30 of body 20 at a location corresponding to region 90 such that surface 75 occupies a circular region of space in a plane perpendicular to first cylinder bore 50 and second cylinder bore 60 directly in line with region 90 (as shown in FIG. 2). In certain embodiments, front mating face 70 may be positioned on front side 30 of body 20 at a location corresponding to region 90 such that that center point 78 of front mating face 70 is directly in line with midpoint 98 with respect to a plane perpendicular to first cylinder bore 50 and second cylinder bore 60 (as shown in FIG. 2).

In certain embodiments, back mating face 80 may be positioned on back side 40 of body 20. In certain embodiments, back mating face 80 may be positioned on back side 40 of body 20 at a location corresponding to region 90. In certain embodiments, back mating face 80 may be positioned on back side 40 of body 20 at a location corresponding to region 90 such that surface 85 occupies a circular region of space in a plane perpendicular to first cylinder bore 50 and second cylinder bore 60 directly in line with intersection region 90. In certain embodiments, back mating face 80 may be positioned on back side 40 of body 20 at a location corresponding to region 90 such that that center point 88 of back mating face 80 is directly in line with midpoint 98 with respect to a plane perpendicular to first cylinder bore 50 and second cylinder bore 60.

In some embodiments, fluid end manifold 10 may comprise one or more front connection surfaces 100 and one or more back connections surfaces 110. Front connections surfaces 100 and back connections surfaces 110 may be located on front side 30 of fluid end manifold 10 and back side 40 of fluid end manifold 10, respectively. In some embodiments, fluid end manifold 10 may comprise 2 front connection surfaces 100 on opposite sides of front mating face 80 and 2 back connection surfaces 110 on opposite sides of back mating face 80, as shown in FIG. 1. Front and back connection surfaces 100 and 110 may be constructed out of any suitable material capable of withstanding pressures of up to 20,000 psi and temperatures up to 400° F. In some embodiments, front and back connection surfaces 100 and 110 may be constructed out of any suitable material, preferably high tensile materials. In some embodiments, front and back connection surfaces 100 and 110 may be constructed of AISI 4140 steel, AISI 4330 steel, or derivatives thereof. In some embodiments, front and back connection surfaces 100 and 110 may be constructed out of the same material as body 20, front mating face 70, and/or back mating face 80. In other embodiments, front connection surface 100 and back connection surface 110 may be constructed out of a material different than body 20, front mating face 70, and/or back mating face 80. Front and back connection surfaces 100 and 110 may be of any shape and size. In some embodiments, front and back connection surfaces 100 and 110 may comprise flat surfaces.

In some embodiments, fluid end manifold 10 may comprise on or more additional cylinder bores 120. In some embodiments, additional cylinder bore 120 may be a horizontal cylinder bore. Additional cylinder 120 bore may be of any size. In some embodiments, additional cylinder bore 120 may be from 0.75 inches to 2 inches in diameter. In some embodiments, additional cylinder bore 120 may extend all the way through body 20. In some embodiments, in addition to extending all the way through body 20, additional cylinder bore 120 may extend through front connection surface 100 and back connection surface 110.

In some embodiments, as shown in FIG. 1, fluid end manifold 10 may comprise two additional cylinder bores 120, two front connections surfaces 100, and two back connections surfaces 110. As shown in FIG. 1, one of the additional cylinder bores 120 may extend through one of the front connection surfaces 100, body 20, and one of the back connection surfaces 110 and the other additional cylinder bore 120 may extend through the other front connection surface 100, body 20, and the other back connection surface 110.

In some embodiments, fluid end manifold 10 may comprise one or more front cross-bars. In some embodiments, fluid end manifold 10 may comprise one or more back cross-bars. Front cross-bar and back cross-bar may be constructed out of any suitable material to withstand pressures of up to 20,000 psi and temperatures up to 400° F. In some embodiments, front cross-bar and back cross-bar may be constructed out of any suitable material, preferably high tensile materials. In some embodiments, front cross-bar and back cross-bar may be constructed of AISI 4130 steel, AISI 4140 steel, or derivatives thereof. In some embodiments, front cross-bar and back cross-bar may be constructed out of the same material as body 20, front and/or back mating faces 70 and 80, and/or front and/or back connection surfaces 100 and 110. In other embodiments, front cross-bar and back cross-bar may be constructed out of a material different than body 20, front and/or back mating faces 70 and 80, and/or front and/or back connection surfaces 100 and 110. Front cross-bar and back cross-bar may be of any shape and size. In some embodiments, front cross-bar and back cross-bar may comprise threaded circular tie rods. In some embodiments, front cross-bar may be attached to the one or more front connection surfaces 100. In some embodiments, front cross-bar may be attached to the one or more front connection surfaces 100 by any means. In some embodiments, back cross-bar may be attached to the one or more back connection surfaces 110. In some embodiments, back cross-bar may be attached to the one or more front connection surfaces 110 by any means. In some embodiments, front cross-bar and back cross-bar may be in contact with front mating face 70 and back mating face 80, respectively.

In some embodiments, fluid end manifold 10 may further comprise one or more hydraulic restraints. In some embodiments, hydraulic restraint may comprise a tie rod. In other embodiments, hydraulic restraint may comprise a hydraulic cylinder. Still in other embodiments, hydraulic restraint may comprise a leadscrew or a prestressed rod. In some embodiments, one or more hydraulic restraints may be located in the one or more additional cylinder bores 120. In some embodiments, as shown in FIG. 1, the fluid end manifold 10 may comprise two hydraulic restraints. In some embodiments, as shown in FIG. 1, the one or more hydraulic restraints may be connected to one or more front connection surfaces 100 and one or more back connection surfaces 110. The hydraulic restraint 150 may be connected to the front and back connection surfaces 100 and 110 by any means. In some embodiments, the one or more hydraulic restraints may provide means for applying compressive forces to fluid end manifold 10. In some embodiments, the hydraulic restraint may provide means for applying compression to the fluid end manifold 10 by tightening the connections of the one or more hydraulic restraints to the one or more front and back connection surfaces 100 and 110, thereby allowing compression to be applied across front mating face 70 and back mating face 80. In some embodiments, upon activation, a rectangular frame may provide restraint to hydraulic cylinders to allow compressive forces to be exerted on the fluid end manifold. Still in other embodiments, a prestressed rod may be set into the additional cylinder bores 120 and attached to the front and back connection surfaces 100 and 110 using thermal expansion and then be allowed to cool to induce the compressive forces.

Figure 3A:
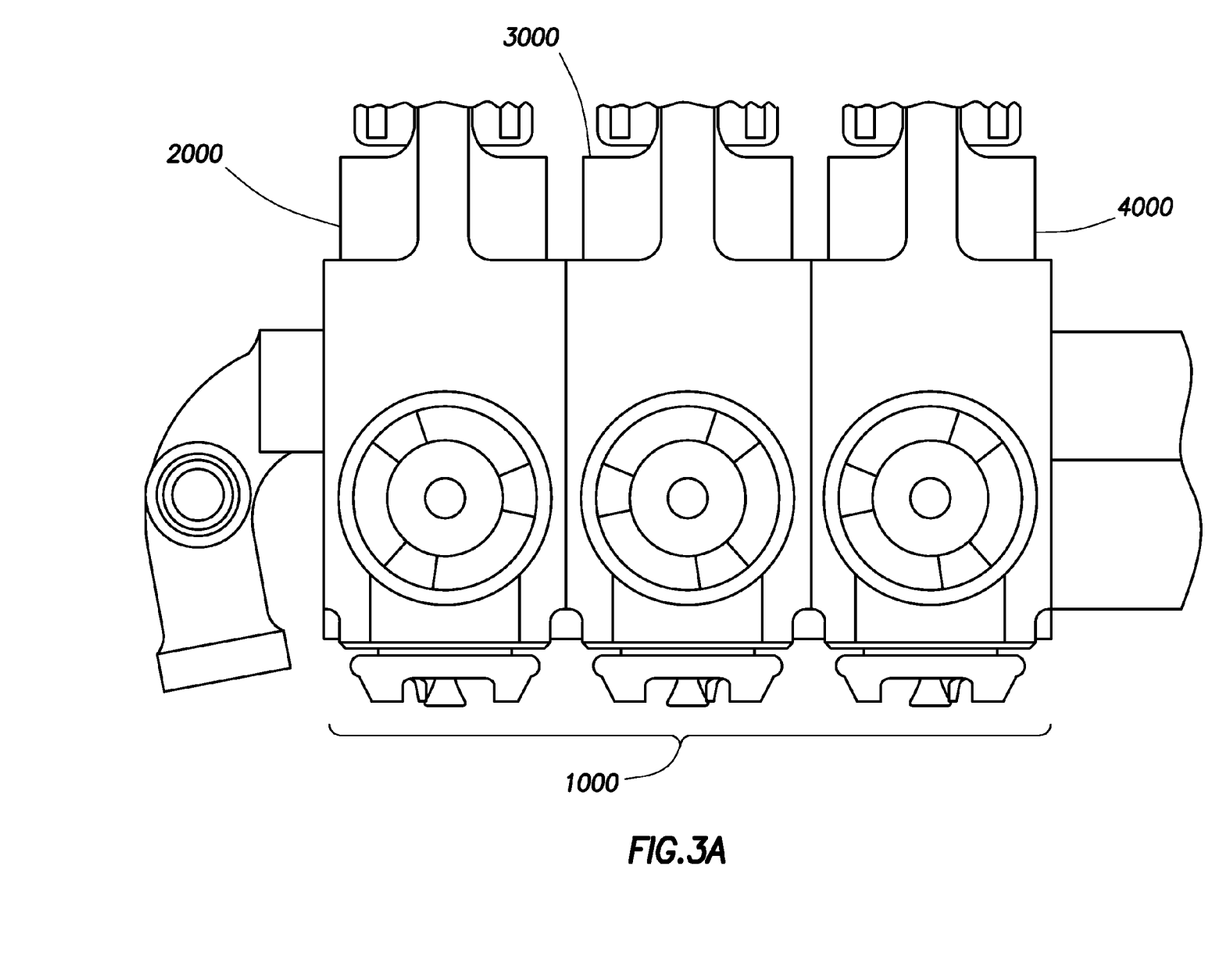
FIGS. 3A and 3B are illustrations of an embodiment of a fluid end manifold assembly of the present invention.
Figure 3B:
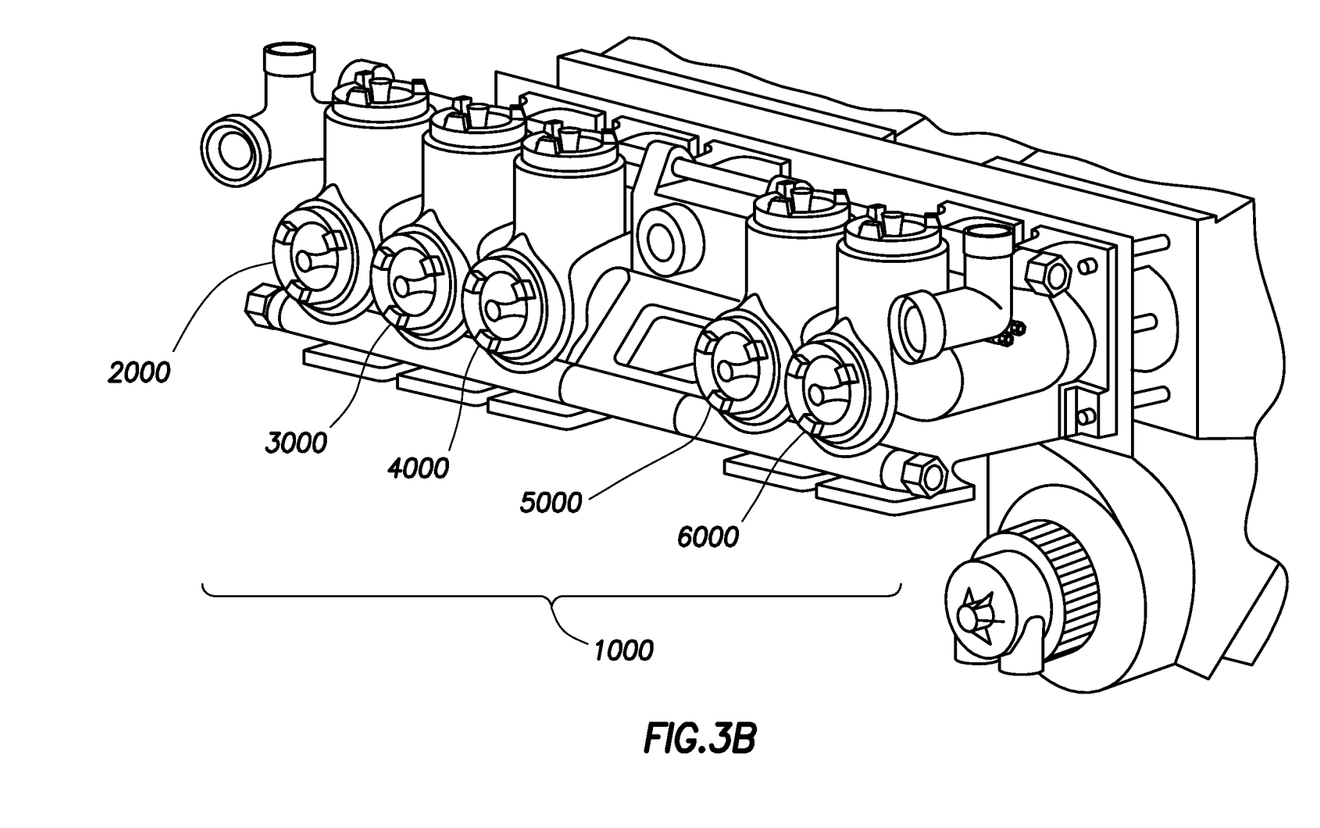

Referring now to FIGS. 3A and 3B, a fluid end manifold assembly 1000 in accordance with one embodiment of the present invention is illustrated. Fluid end manifold assembly 1000 may comprise one or more fluid end manifolds. In one embodiment, as illustrated in FIGS. 3A and 3B, fluid end manifold assembly 1000 may comprise a first fluid end manifold 2000, a second fluid end manifold 3000, and a third fluid end manifold 4000. Furthermore, as shown in FIG. 3B, fluid end assembly 1000 may comprise a fourth fluid end manifold 5000 and a fifth fluid end manifold 6000. In some embodiments, fluid end manifold assembly 1000 may comprise two fluid end manifolds. In other embodiments, fluid end manifold assembly may comprise three fluid end manifolds. In other embodiments, fluid end manifold assembly 1000 may comprise more than three fluid end manifolds.

In some embodiments, first fluid end manifold 2000, second fluid end manifold 3000, and/or third fluid end manifold 4000 may comprise same components as described above with respect to fluid end manifold 10. In some embodiments, first fluid end manifold 2000 may include a body, a front side, a back side, a first cylinder bore, a second cylinder bore, a midpoint, a front mating face with a center point, a back mating face with a center point, front connection surfaces, back connection surfaces, additional cylinder bores, and a front cross-bar. In some embodiments, second fluid end manifold 3000 may include a body, a front side, a back side, a first cylinder bore, a second cylinder bore, a midpoint, a front mating face with a center point, a back mating face with a center point, front connection surfaces, back connection surfaces, and additional cylinder bores. In some embodiments, third fluid end manifold 4000 may include a body, a front side, a back side, a first cylinder bore, a second cylinder bore, a midpoint, a front mating face, with a center point, a back mating face with a center point, front connection surfaces, back connection surfaces, additional cylinder bores, and back cross-bar.

In certain embodiments, fluid end manifold assembly 1000 may comprise one or more hydraulic restraints. Hydraulic restraints may extend through the front connection surfaces, additional cylinder bores, and back connection surfaces. Hydraulic restraints may be attached to front connection surfaces and back connection surfaces.

In certain embodiments, fluid end manifold assembly 1000 may be configured such that one or more of front mating faces, back mating faces, center points, and midpoints are in line. In one embodiment, front mating faces, back mating faces, center points, and midpoints may each be in line.

In some embodiments, fluid end manifold assembly 1000 may be configured such that one or more of front mating faces may be in contact with one or more of back mating faces. In some embodiments, fluid end manifold assembly 1000 may be configured such that one or more of front connection surfaces may be in contact with one or more back connections surfaces. In one embodiment, fluid end manifold assembly 1000 may be configured such that back mating face is in contact with front mating face, back mating face is in contact with front mating face, back connection surfaces are in contact with front connection surfaces, and back connection surfaces are in contact with front connection surfaces.

In some embodiments, fluid end manifold assembly 1000 may be configured such that a compressive force may be applied against each of front mating faces and back mating faces. In some embodiments, fluid assembly 1000 may comprise two hydraulic restraints. In some embodiments, the one or more hydraulic restraint may be connected to one or more front connection surfaces and one or more back connection surfaces. In one embodiment, front connection surfaces may be connected to one another by a front cross-bar. In one embodiment, back connection surfaces may be connected to one another by a back cross-bar. In some embodiments, front cross bar may be in contact with front mating face. In some embodiments, back cross bar may be in contact with back mating face. In some embodiments, a compressive force may be applied against each of front mating faces and back mating faces by any means. In some embodiments, a compressive force may be applied against each of front mating faces and back mating faces by tightening connections of the one or more hydraulic restraints to front connection surface and back connection surface. In some embodiments, a compressive force may be applied against each of front mating faces and back mating faces by utilizing a rectangular frame which upon activation may provide restraint to hydraulic cylinders disposed within the additional cylinder bores to allow compressive forces to be exerted on the fluid end manifold assembly. Still in other embodiments, a prestressed rod may be set into the additional cylinder bores and attached to the front surface and back connection surface using thermal expansion and then be allowed to cool to induce the compressive forces.

In some embodiments, the present invention provides a method for inducing compressive stresses within a fluid end manifold. In some embodiments, the fluid end manifold may be fluid end manifold as described above. In some embodiments, the present invention provides a method for inducing a compressive stress within a fluid end manifold assembly. In some embodiments, the fluid end manifold assembly may be a fluid end manifold assembly as described above. In some embodiments, the present invention provides a method for inducing a compressive stress within a fluid end manifold or a fluid end manifold assembly by applying compressive forces in regions of high stress. In some embodiments, the regions of high stress may correspond to an intersection region of two cylinder bores in a fluid end manifold as described above. In some embodiments, applying compressive forces in the regions of high stress may be accomplished by applying compressive forces to mating faces positioned in the region of high stress. The mating faces may comprise mating faces as described above and may be positioned one the fluid bodies as described above. Compressive forces may be applied to the mating faces as described above.

Without wishing to be limited to theory, it is believed that the application of compressive forces along the mating faces of the fluid end manifolds may achieve compressive loading within the fluid end manifold, especially within the regions subject to high stress when in operation. Regions subject to high stress include the regions where the surfaces of the cylinder bores intersect. This compressive loading may reduce the natural tendency for these regions of the fluid end manifold to flex while under operation and reduce the tensile stresses of those regions. The ring shaped mating faces described herein are believed to offer an additional advantage of allowing areas inside the ring shape to flex. While not wishing to be limited to theory, it is believed that the ring areas provide contact interface between each fluid end manifold that corresponds with an internal expansion area of the fluid end manifold. When the internal pressure is applied, the area of the rings are under compression which results in a reduction of stress level at the key bore intersection points. In certain embodiments, areas inside of the ring shape are not under compression, or are under less compression than the areas covered by the rings, and able to flex and expand.

Although the present invention and its advantages have been described in detail, it should be understood that various changes, substitutions and alternations can be made herein without departing from the spirit and scope of the invention as defined by the following claims.

What is claimed is:

1. A fluid end manifold for a reciprocating pump, the fluid end manifold comprising:
a body comprising:
a first cylinder bore formed horizontally through the first body;
a second cylinder bore formed vertically through the first body and intersecting the first cylinder bore to define an intersection region, the intersection region comprising a plurality of contact points where an inner surface of the first cylinder bore contacts an inner surface of the second cylinder bore, wherein the first and second cylinder bores are the only cylinder bores intersecting within the body; and
a ring-shaped first mating face with an outer diameter and an inner diameter disposed along a side of the body and positioned at a location corresponding to the intersection region, wherein the ring-shaped first mating face is formed in a plane that is perpendicular to a plane defining a radial cross section of the first cylindrical bore and to a plane defining a radial cross section of the second cylindrical bore;
said ring-shaped first mating face operable to connect to a ring-shaped second mating face such that a stress level at the plurality of contact points is reduced while permitting areas of the body inside the inner diameter of the ring-shaped first mating face to flex more than the ring-shaped first mating face.

2. The fluid end manifold of claim 1, wherein the body comprises a first front connection surface, a second front connection surface, a first back connection surface, and a second back connection surface, a third cylinder bore extending through the body from the first front connection surface to the first back connection surface, and a fourth cylinder bore extending through the body from the second front connection surface to the second back connection surface.

3. The fluid end manifold of claim 2, further comprising a hydraulic restraint connected to the first front connection surface and the first back connection surface for applying compression to the fluid end manifold by tightening the connection of the hydraulic restraint to the first front and back connection surfaces to apply compression across the ring-shaped first mating face.

4. The fluid end manifold of claim 2, further comprising a front cross-bar and a back cross-bar, the front cross-bar being connected to the first front connection surface and the second front connection surface, the back cross-bar being connected to the first back connection surface and the second back connection surface.

5. The fluid end manifold of claim 1, wherein the inner diameter of the ring-shaped first mating face is smaller than a diameter of the intersection region and the outer diameter of the ring-shaped first mating face is larger than the diameter of the intersection region.

6. The fluid end manifold of claim 1, wherein the inner diameter of the ring-shaped first mating face is between approximately 1 inch and approximately 6 inches, and wherein the outer diameter of the ring-shaped first mating face is between approximately 3.125 inches and approximately 9 inches.

* * * * *